(12) United States Patent  (10) Patent No.: US 8,228,443 B2
Sawai  (45) Date of Patent: Jul. 24, 2012

(54) VIDEO PROJECTION DEVICE

(75) Inventor: Yasumasa Sawai, Yamatotakada (JP)

(73) Assignee: Konica Minolta Opto, Inc., Tokyo (JP)

( * ) Notice: Subject to any disclaimer, the term of this patent is extended or adjusted under 35 U.S.C. 154(b) by 1012 days.

(21) Appl. No.: 12/125,354

(22) Filed: May 22, 2008

(65) Prior Publication Data

US 2008/0297668 A1  Dec. 4, 2008

(30) Foreign Application Priority Data

May 29, 2007 (JP) ................................. 2007-142033

(51) Int. Cl.
H04N 5/74 (2006.01)

(52) U.S. Cl. ........ 348/744; 353/101; 353/100; 359/691; 359/694

(58) Field of Classification Search .................. 348/744; 359/651, 649, 691–694, 686, 823; 353/100, 353/101

See application file for complete search history.

(56) References Cited

U.S. PATENT DOCUMENTS

| | | | | |
|---|---|---|---|---|
| 4,614,974 A * | 9/1986 | Toyama | ......................... | 348/348 |
| 6,317,169 B1 * | 11/2001 | Smith | ........................... | 348/744 |
| 6,486,925 B1 * | 11/2002 | Ko | ................................. | 348/731 |
| 6,486,926 B1 * | 11/2002 | Heizmann et al. | ............. | 348/746 |
| 6,587,159 B1 | 7/2003 | Dewald | | |
| 6,594,090 B2 * | 7/2003 | Kruschwitz et al. | .......... | 359/707 |
| 6,769,773 B1 * | 8/2004 | Wu | ................................. | 353/33 |
| 6,796,655 B2 * | 9/2004 | Seki | ................................ | 353/20 |
| 7,244,032 B2 * | 7/2007 | Inamoto | .......................... | 353/94 |
| 7,391,577 B2 * | 6/2008 | Inamoto | ........................ | 359/649 |
| 2003/0067589 A1 | 4/2003 | Kimura | | |
| 2007/0076302 A1 | 4/2007 | Inamoto | | |

FOREIGN PATENT DOCUMENTS

| | | |
|---|---|---|
| JP | 06-273695 | 9/1994 |
| JP | 2000-029137 | 1/2000 |
| JP | 2003-114480 | 4/2003 |
| JP | 2005-062212 | 3/2005 |

OTHER PUBLICATIONS

Japanese Office Action dated Apr. 10, 2012 in corresponding Japanese patent application No. JP 2007-142033.

* cited by examiner

*Primary Examiner* — Annan Shang

(74) *Attorney, Agent, or Firm* — Cozen O'Connor

(57) ABSTRACT

A video projection device includes: a video display element, a projection lens, a converter lens, and a video processing part. The video display element displays a video by an electrical video signal. The projection lens projects on a screen the video displayed on the video display element. The converter lens is attachably and detachably provided for the projection lens. The video processing part outputs different video signals to the video display element in accordance with whether or not the converter lens is attached.

16 Claims, 14 Drawing Sheets

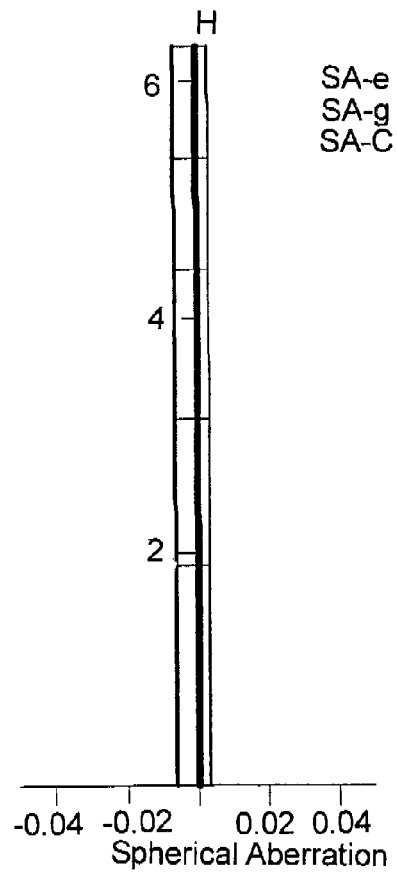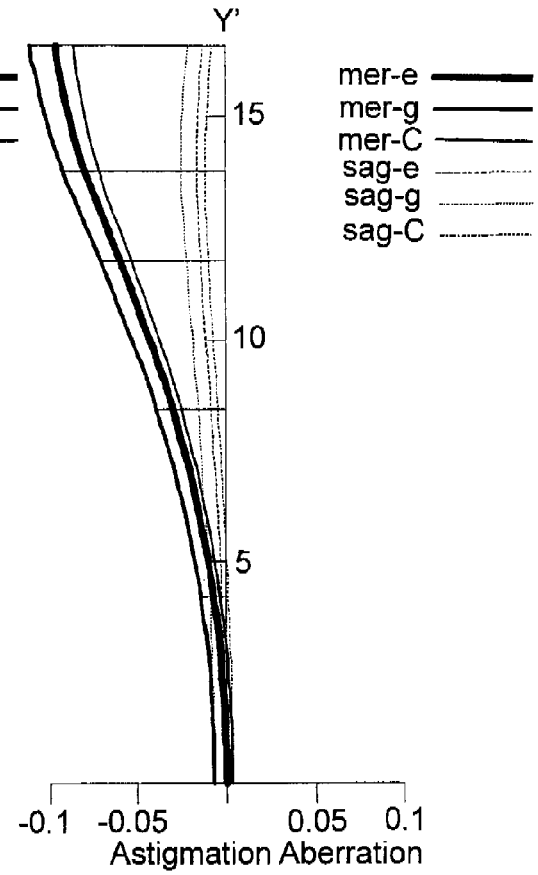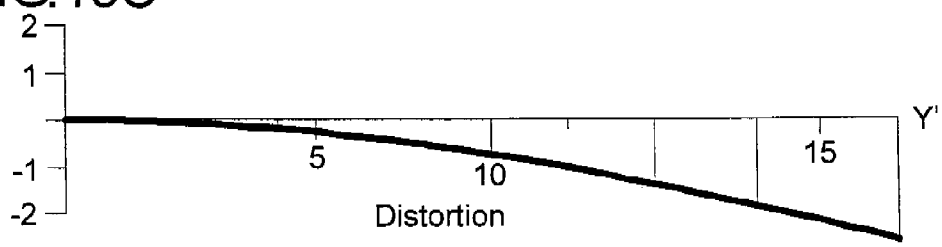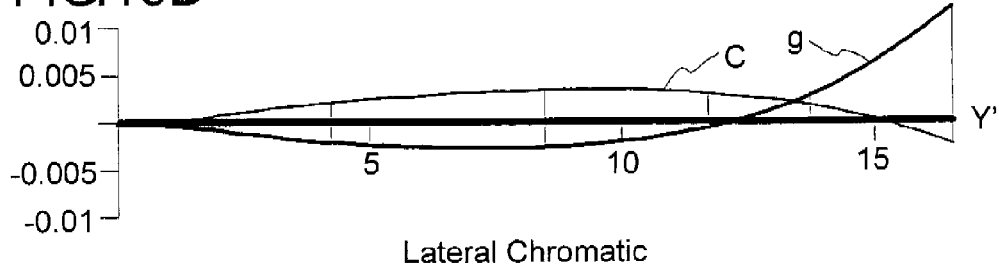

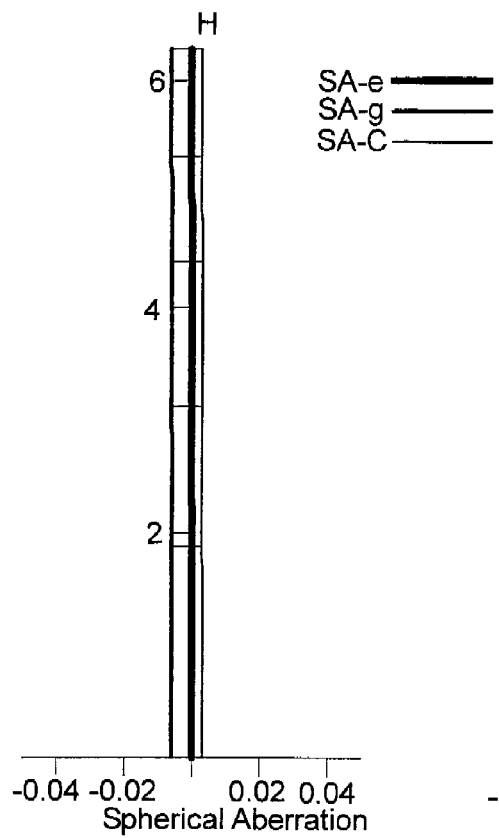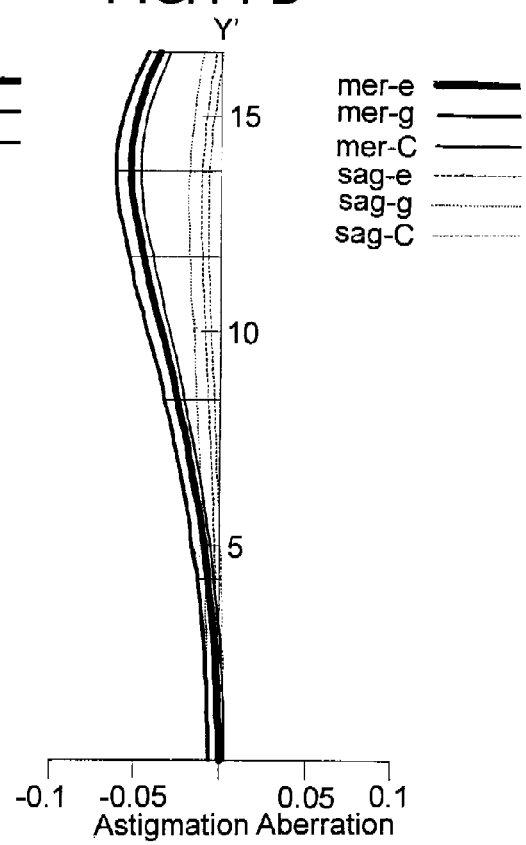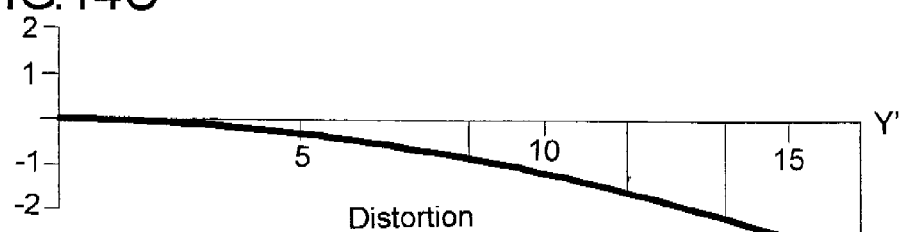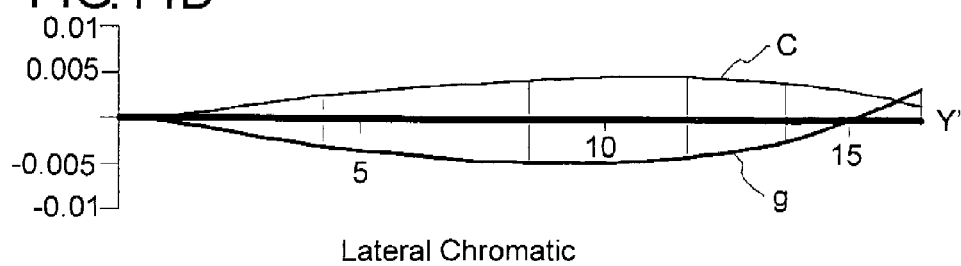

VIDEO PROJECTION DEVICE

This application claims priority on Japanese Patent Application No. 2007-142033 filed on May 29, 2007, the contents of which are hereby incorporated by reference.

BACKGROUND OF THE INVENTION

1. Field of the Invention

The present invention relates to a video projection device, and more specifically to a video projection device (for example, projector for digital cinema) having a converter lens attachably and detachably provided for a projection lens.

2. Description of Related Art

For movies, it is required to reproduce and express movie creator's intention including their tone as faithfully as possible. Thus, in recent digital cinema, various regulations related to chromaticity etc. on a projection system therefor have been defined. On the other hand, in theaters, a converter lens is attached to a projection lens in order to deal with various image plane formats (for example, see Patent Document 1).

Patent Document 1: U.S. Pat. No. 6,587,159

In a large projection system, for example, the one for projecting a movie, a converter lens used is also large. Moreover, a transmittance characteristic, etc. of an entire projection optical system also change under the influence of absorption by an optical material used in the converter lens, reflection on a lens interface, etc. Thus, it is a challenge to satisfy the aforementioned regulations even when the converter lens is attached. However, a conventional movie projection system as described in Patent Document 1 is basically designed for film projection and thus is not designed to correct a change in video characteristics caused by attaching the converter lens.

A projector for film projection has difficulties in correcting the change in the video characteristics caused by attaching the converter lens. This is because, for example, a color filter needs to be added to an illumination optical system to change the tone and an aperture mechanism needs to be provided to change the brightness. This results in formation of a massive device as a whole, leading to cost increase. Providing a color filter in the converter lens in particular is not preferable due to concern about interplanar ghost. Changing the projection position requires movement of a physically large projection lens, which results in formation of a massive device as a whole, leading to cost increase. Under these circumstances, for a projector for digital projection, no efforts have yet been made to improve video characteristics that changes as a result of attaching the converter lens.

SUMMARY OF THE INVENTION

In view of the circumstances described above, the present invention has been made, and it is an object of the invention to provide a video projection device and a video projection method capable of providing favorable video characteristics regardless of whether or not a converter lens is attached.

According to one aspect of the invention, a video projection device includes: a video display element displaying a video by an electrical video signal; a projection lens projecting on a screen the video displayed on the video display element; a converter lens attachably and detachably provided for the projection lens; and a video processing part outputting different video signals to the video display element in accordance with whether or not the converter lens is attached.

According to another aspect of the invention, a video projection method includes: a display step of displaying a video on a video display element by an electrical video signal; a projection step of projecting, on a screen by a projection lens, the video displayed on the video display element; a attaching step of attaching a converter lens in front of the projection lens; a judging step of judging whether or not the converter lens has been attached to the projection lens; and a signal output step of switching a video signal to the video display element in accordance with whether or not the converter lens has been attached to the projection lens.

BRIEF DESCRIPTION OF THE DRAWINGS

FIGS. 13A to 13D are aberration diagrams in the state shown in FIG. 12A; and

FIGS. 14A to 14D are aberration diagrams in the state shown in FIG. 12B.

DETAILED DESCRIPTION OF PREFERRED EMBODIMENTS

Figure 1A:
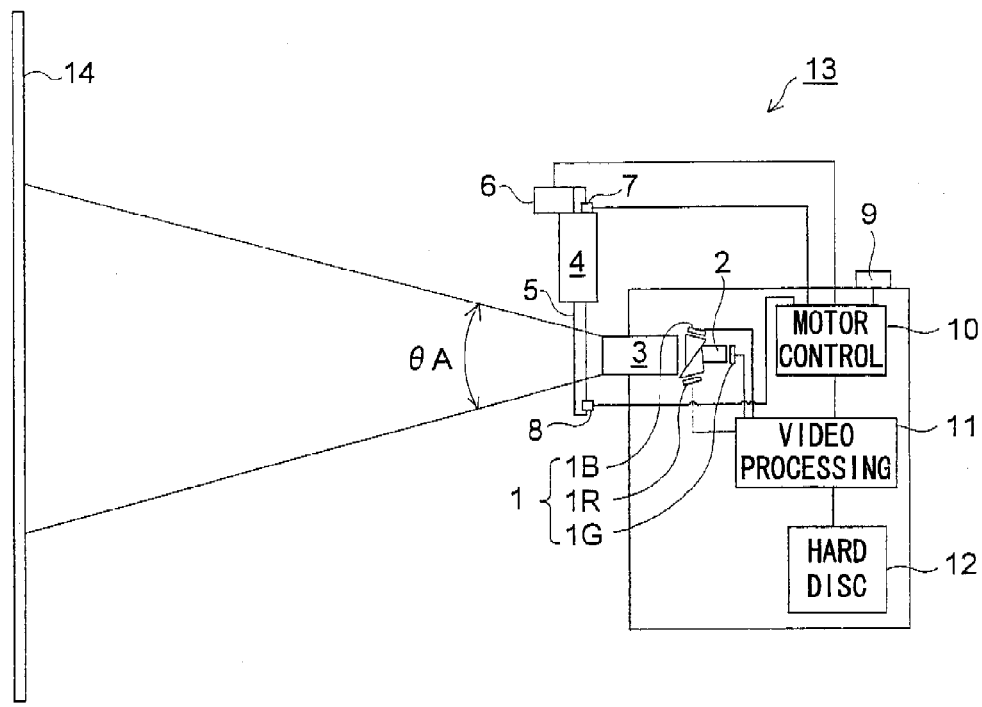
FIGS. 1A and 1B are schematic configuration diagrams showing one embodiment of a video projection device before and after a converter lens is attached.
Figure 1B:
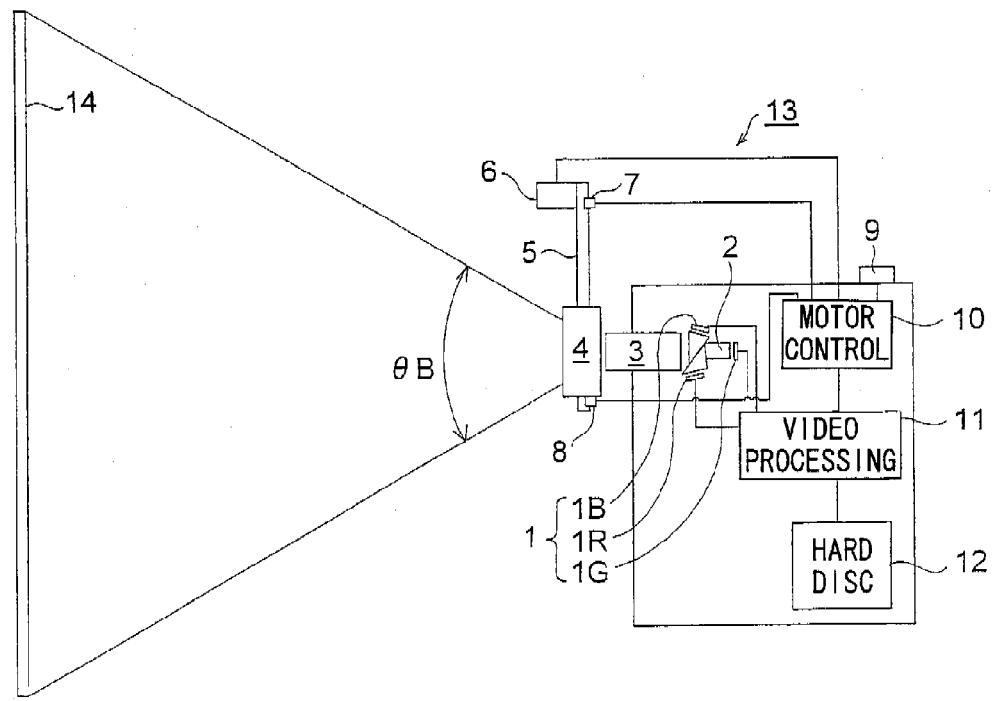

Hereinafter, embodiments, etc. of a video projection device according to the present invention will be described with reference to the accompanying drawings. FIGS. 1A and 1B show schematic configuration of a video projection device 13 according to one embodiment of the invention. This video projection device 13 projects, on a screen 14 by using a projection lens 3 attachably and detachably provided with a converter lens 4, a video displayed on a video display element 1 by an electrical video signal. FIG. 1A shows a state before the converter lens 4 is attached (non-attached state), and FIG. 1B shows a state after the converter lens 4 is attached (attached state). Here, a projector for digital cinema is assumed as the video projection device 13, but it can also be used for other applications (a projector for home theater, etc.).

The video projection device 13 has a dichroic prism 2, the projection lens 3, the converter lens 4, etc. in a projection optical system. The video projection device 13, for attachment and detachment of the converter lens 4 to and from the projection lens 3 (hereinafter, expressions "attachment", "detachment", "attaching", "detaching", "attached", "detached", etc. mean optical attachment, optical detachment, optically attaching, optically detaching, optically attached, optically detached, etc., and thus do not mean actual physical contact nor non-contact), has: a rail 5, a motor 6, position sensors 7 and 8, a driving switch 9, a motor control part 10, etc. In addition, the video projection device 13 has: the video display element 1 displaying a video by an electrical video signal; a hard disc 12 storing a video signal as electronic data; and a video processing part 11 performing signal processing on an electrical video signal.

The converter lens 4 is a front-type wide converter lens and detachably arranged in front of the projection lens 3 (that is, on an enlargement side, screen 14 side). The converter lens refers to a lens system to be attached to a projection lens (or photographing lens) to thereby switch the angle of view. As this converter lens 4, a wide type converter lens for enlarging the angle of view is assumed.

In front of the projection lens 3, the rail 5 is fixed, on which the converter lens 4 is provided. The converter lens 4 is electrically moved on the rail 5, and can be brought into either of: a attached state in which the converter lens 4 is inserted in the front of the projection lens 3 and thereby located on an optical path of projection light as shown in FIG. 1B; and a non-attached state (retracted state) in which the converter lens 4 is retracted from in front of the projection lens 3 and thereby located out of the optical path of projection light as shown in FIG. 1A. Angles θA and θB in FIGS. 1A and 1B correspond to projection ranges, where relationship θA<θB holds.

When the driving switch 9 is turned on in the non-attached state of the converter lens 4 shown in FIG. 1A, the motor 6 is activated by the motor control part 10, and by its driving force the converter lens 4 moves on the rail 5, changing from the retracted state to the attached state (FIG. 1B). When the attached state of the converter lens 4 is detected by the position sensor 8 provided at the end of the rail 5, the motor 6 is stopped by the motor control part 10. On the other hand, when the driving switch 9 is inverted in the attached state of the converter lens 4 shown in FIG. 1B, the motor 6 is activated by the motor control part 10, and by its driving force, the converter lens 4 moves on the rail 5, changing from the attached state to the retracted state (FIG. 1A). When the retracted state of the converter lens 4 is detected by the position sensor 7 provided at the end of the rail 5, the motor 6 is stopped by the motor control part 10.

The video projection device 13 reads a video signal stored as electronic data in the hard disc 12, and displays a video on the video display element 1 in accordance with this video signal. In this video projection device 13, three video display elements 1R, 1G, and 1B for displaying videos of different colors, red (R), green (G), and blue (B) are provided as the video display element 1. On a video display surface of each of the video display elements 1R, 1G, and 1B, a two-dimensional image is formed by modulating illumination light. White light from a light source (not shown) is color-separated by the dichroic prism 2, illuminating the video display surfaces of the video display elements 1R, 1G, and 1B for the different colors. Reflected light from the video display elements 1R, 1G, and 1B is color-synthesized by the dichroic prism 2 and projected as a color video on the screen 14 by the projection lens 3.

In this video projection device 13, a digital micromirror device is assumed as the video display element 1, but the video display element 1 used is not limited thereto, and thus any other non-luminous, reflective (or transmissive) display element (for example, liquid crystal display element) suitable for a projection optical system may be used. When a digital micromirror device is used as the video display element 1, light incident thereon is spatially modulated by being reflected by each micromirror in an ON or OFF state (for example, at an inclination of ±12°). At this point, only the light reflected by the micromirrors in the ON state is made incident on the projection lens 3 and then projected on the screen 14.

Between the video display element 1 and the hard disc 12, the video processing part 11 lies. A video signal stored as electric data in the hard disc 12 is transmitted to each video display element 1 via the video processing part 11. This video processing part 11 has a plurality of processing patterns, checks with the position sensors 7 and 8 whether or not the converter lens 4 is attached, and changes the processing pattern for a video depending on check state. Here, a description will be given, referring to three switching examples of processing patterns for different signal processing performed on a video signal in accordance with whether or not the converter lens 4 is attached (that is, whether before or after the attachment).

Figure 2:
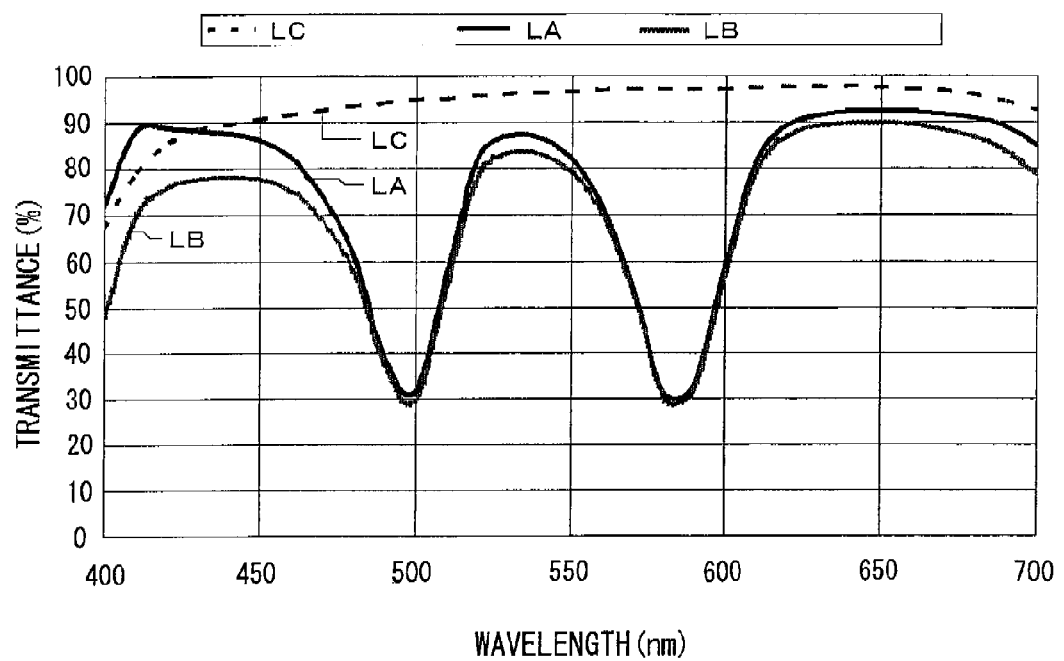
FIG. 2 is a graph showing transmittance characteristics of a projection optical system before and after the converter lens is attached.

The first switching example of processing patterns relates to tone correction by signal processing performed so that the tone (hue, tint, etc.) of a video displayed on the video display element 1 varies in accordance with whether or not the converter lens 4 is attached. To faithfully express the tone of a movie work, the video projection device 13 is required to perform strict color control. However, an increase in the number of lenses of the entire projection optical system as a result of attaching the converter lens 4 decreases the ratio of rays on a short wavelength side where absorption is relatively large, thereby leading to tone change. This tone change (that is, transmittance characteristics of the entire projection optical system before and after the converter lens 4 is attached) is shown in FIG. 2. In FIG. 2, a curve LA shows the transmittance characteristic of the projection optical system in a state (FIG. 1A) in which the converter lens 4 is not attached to the projection lens 3, a curve LB shows the transmittance characteristic of the projection optical system in a state (FIG. 1B) in which the converter lens 4 is attached to the projection lens 3, and a curve LC (broken line) shows the transmittance characteristic of the converter lens 4 only.

As can be seen from FIG. 2, the converter lens 4 tends to have increasingly lower transmittance toward the short wavelength side. Thus, when the converter lens 4 is attached to the projection lens 3, a projected image changes to be yellowish. To avoid such tone change of the projected image, signal processing may be performed so that the tone of a video displayed on the video display element 1 varies in accordance with whether or not the converter lens 4 is attached. Specifically, in the attached state of the converter lens 4, signal processing of relatively enhancing the signal intensity for the video display element 1B may be performed so as to emphasize a blue color of a video displayed on the video display element 1, or signal processing of relatively weakening the signal intensities for the video display elements 1R and 1G may be performed so as to weaken a red and a green colors of the video displayed on the video display element 1. Canceling a change in the transmittance characteristics caused by the converter lens 4 through tone correction of the video displayed on the video display element 1 in this manner can keep favorable balance so that the tone of a projected image does not change. Therefore, regardless of whether or not the converter lens 4 is attached, favorable video characteristics can be easily provided at low costs.

More specifically, as shown in FIG. 1A, when the position sensor 7 confirms the non-attached state (retracted state) of the converter lens 4, original video data in the hard disc 12 is subjected to signal processing in a normal processing pattern. A video signal obtained is transmitted to the video display elements 1R, 1G, and 1B corresponding to light of the different colors, and its display image is projected on the screen 14 by the projection lens 3. As shown in FIG. 1B, when the position sensor 8 confirms the attached state (inserted state) of the converter lens 4, the original video data in the hard disc 12 is subjected to signal processing in a tone correction processing pattern. A video signal obtained is transmitted to the video display elements 1R, 1G, and 1B corresponding to light of the different colors, and its display image is projected on the screen 14 by the projection lens 3 and the converter lens 4.

Figure 3A:
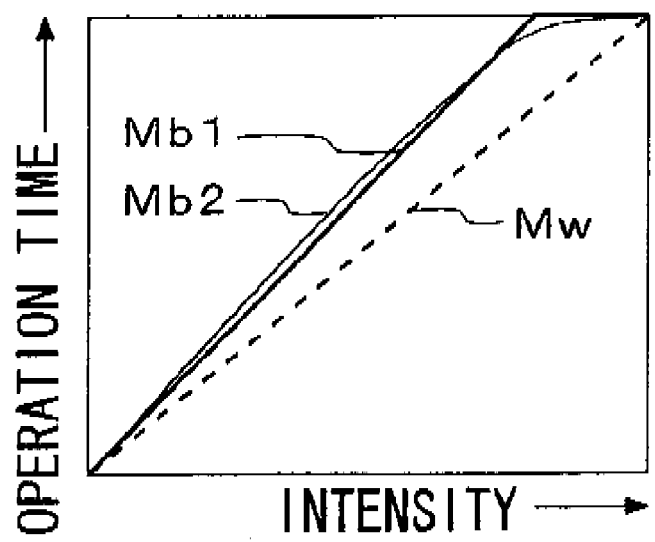
FIGS. 3A and 3B are graphs showing detailed examples of tone correction by signal processing.
Figure 3B:
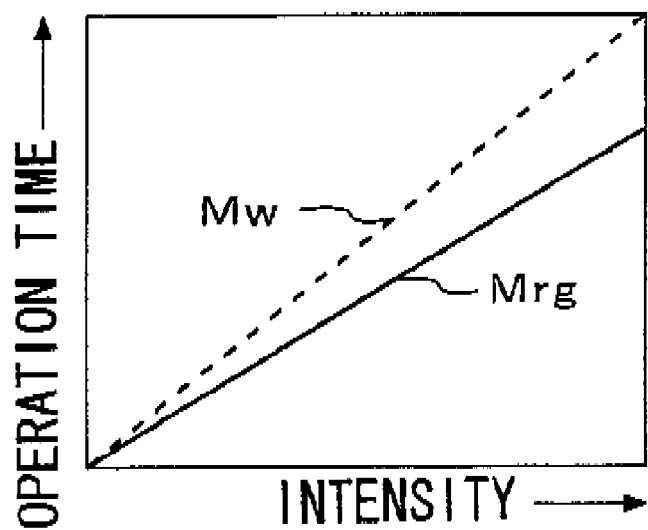

FIGS. 3A and 3B show detailed examples of the tone correction by the signal processing described above. In each graph of FIGS. 3A and 3B, a horizontal axis denotes intensity representing brightness information contained in original video data and a vertical axis denotes operation time of the video display element 1 (ON time for video display). Therefore, longer operation time of the video display element 1 more emphasizes a color of a video displayed on this video display element 1. A broken line Mw in FIGS. 3A and 3B shows the normal processing pattern used for signal processing in the non-attached state of the converter lens 4. Solid lines Mb1, Mb2, and Mrg in FIGS. 3A and 3B show tone correction processing patterns used for the signal processing in the attached state of the converter lens 4.

The thick solid line Mb1 and the thin solid line Mb2 in FIG. 3A show the tone correction processing patterns used for the signal processing of relatively enhancing the signal intensity for the video display element 1B so as to emphasize the blue color (B) of a video displayed on the video display element 1B. Therefore, for the signal intensities for the video display elements 1R and 1G, signal processing is performed in the normal processing pattern indicated by the broken line Mw. With the tone correction processing pattern indicated by the thick solid line Mb1, the blue color (B) is emphasized linearly with respect to the brightness information and becomes saturated at an upper limit. With the tone correction processing pattern indicated by the thin solid line Mb2, a change in the emphasis level of the blue color (B) with respect to the brightness information becomes gradually weak. The solid line Mrg in FIG. 3B shows the tone correction processing pattern used for the signal processing of relatively weakening the signal intensities for the video display elements 1R and 1G so as to weaken the red color (R) and the green color (G) of the video displayed on the image display elements 1R and 1G. Therefore, for the signal intensity for the video display element 1B, the signal processing is performed in the normal processing pattern indicated by the broken line Mw. The converter lens 4 used in the first switching example of processing patterns described above is not limited to a wide converter lens, and applicable in the same manner to a teleconverter lens and an anamorphic converter lens.

Figure 4A:
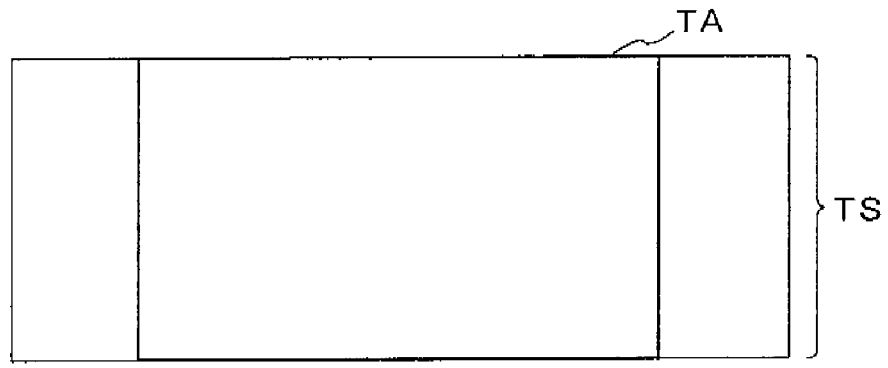
FIGS. 4A and 4B are diagrams showing a change in a projection region as a result of attaching the converter lens.
Figure 4B:
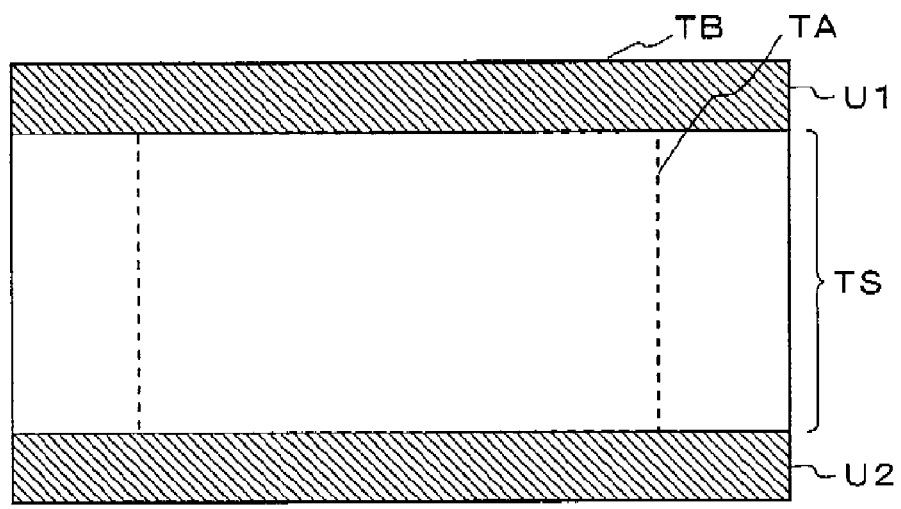

The second switching example of processing patterns relates to brightness correction by signal processing performed so that the brightness level of a video displayed on the video display element 1 varies in accordance with whether or not the converter lens 4 is attached. In a theater, in view of viewability and safety during a movie, illumination of the ceiling and a foot area are set so that the brightness of a projected image is optimized. However, a change in the size of a projection image face on the screen 14 as a result of attaching the converter lens 4 changes the brightness on the screen surface. FIGS. 4A and 4B show this change in the size of the projection image face. FIG. 4A shows a projection region TA in the non-attached state of the converter lens 4 (FIG. 1A). FIG. 4B shows a projection region TB in the attached state of the converter lens 4 (FIG. 1B).

The screen 14 has an aspect ratio corresponding to a scope size (aspect ratio=2.38:1). Therefore, to project a movie in a vista size (aspect ratio=1.85:1), the converter lens 4 is put into a retracted state (FIG. 1A), and the projection region TA is adjusted at a longitudinal size of a screen region TS as shown in FIG. 4A. As a result, the screen region TS becomes wider in a lateral direction than the projection region TA. On the other hand, to project a movie in a scope size, the converter lens 4 is put into an attached state (FIG. 1B), and the projection region TB is widened across the full lateral width of the screen region TS as shown in FIG. 4B. Thus, for regions beyond the screen region TS in the vertical direction, non-display is achieved on the video display element 1 side (U1, U2: non-display regions).

For example, in a case of a video display element 1 having a video display surface composed of 2048 pixels×1080 pixels, of these pixels, 1998 pixels×1080 pixels are used to display a video for a vista size, and 2048 pixels×858 pixels are used for a scope size. Thus, use of a wide converter lens reduces the brightness of a video on the screen surface mainly due to an increase in the size of the projection image face (on the other hand, use of a teleconverter lens increases the brightness). Since the illumination inside a theater is set in view of viewability and safety while assuming the specific brightness on the screen surface, it is not preferable that the brightness on the screen surface changes depending on whether or not the converter lens 4 is present (that is, a movie to be played).

To avoid a change in the brightness of a projected image, signal processing may be performed so that the brightness of a video displayed on the video display element 1 varies in accordance with whether or not the converter lens 4 is attached. Specifically, it may be detected whether or not the converter lens 4 is present, and the brightness level of the video displayed on the video display element 1 may be increased if the converter lens 4 is attached (inserted), and the brightness level of the video displayed on the video display element 1 may be decreased if the converter lens 4 is not attached (retracted) (note that the opposite applies when a teleconverter lens is used). Canceling a change in the brightness caused by the converter lens 4 through brightness correction of the video displayed on the video display element 1 in this manner permits maintaining optimum condition for viewing a projected image so that the brightness of the projected image does not change. Therefore, regardless of whether or not the converter lens 4 is attached, favorable video characteristics can be easily provided at low costs.

Even more specifically, as shown in FIG. 1A, when the position sensor 7 confirms the non-attached state (retracted state) of the converter lens 4, original video data in the hard disc 12 is subjected to signal processing in the normal processing pattern. A video signal obtained is transmitted to the video display elements 1R, 1G, and 1B respectively corresponding to light of the different colors, and its display image is then projected on the screen 14 by the projection lens 3. As shown in FIG. 1B, when the position sensor 8 confirms the attached state (inserted state) of the converter lens 4, the original video data in the hard disc 12 is subjected to signal processing in the brightness correction processing pattern. A video signal obtained is transmitted to the video display elements 1R, 1G, and 1B respectively corresponding to light of the different colors, and its display image is then projected on the screen 14 by the projection lens 3 and the converter lens 4.

Figure 5A:
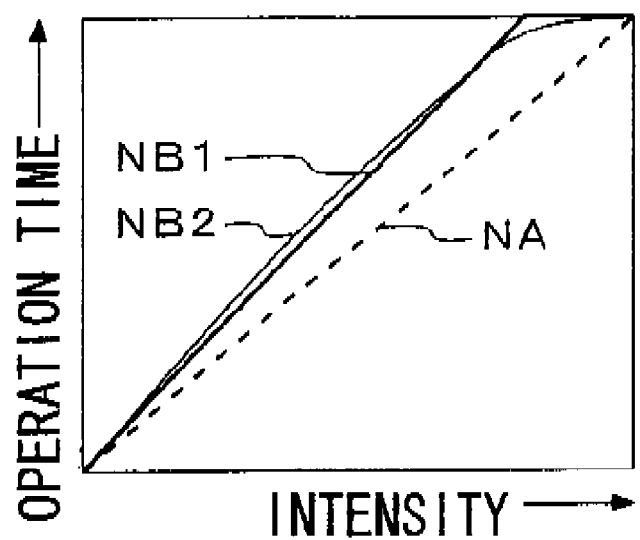
FIGS. 5A and 5B are graphs showing detailed examples of brightness correction by signal processing.
Figure 5B:
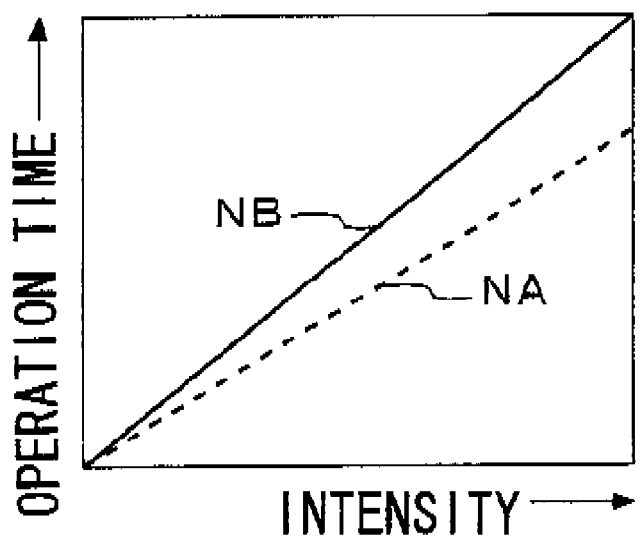

FIGS. 5A and 5B show a detailed example of brightness correction by the signal processing described above. In each graph of FIGS. 5A and 5B, a horizontal axis denotes the intensity indicating brightness information contained in original video data, and a vertical axis denotes operation time of the video display element 1 (ON time for video display). Therefore, longer operation time of the three video display elements 1R, 1G, and 1B results in a brighter video displayed. A broken line NA in FIGS. 5A and 5B shows the normal processing pattern used for signal processing performed in the non-attached state of the converter lens 4. Solid lines NB1, NB2, and NB in FIGS. 5A and 5B show brightness correction processing patterns used for signal processing performed in the attached state of the converter lens 4.

With the brightness correction processing pattern indicated by the thick solid line NB1 in FIG. 5A, a display video becomes brighter linearly with respect to the brightness information and becomes saturated at an upper limit. With the brightness correction processing pattern indicated by the thin solid line NB2, a change in the brightness level of the display video with respect to the brightness information becomes gradually weaker. For the solid line NB in FIG. 5B, an upper limit of the brightness of the video displayed on the video display element 1 is set higher than that of the normal processing pattern (indicated by the broken line NA). The converter lens 4 used in the second switching example of processing patterns described above is not limited to a wide converter lens, but is applicable basically with the same idea to a teleconverter lens and an anamorphic converter lens.

Figure 6A:
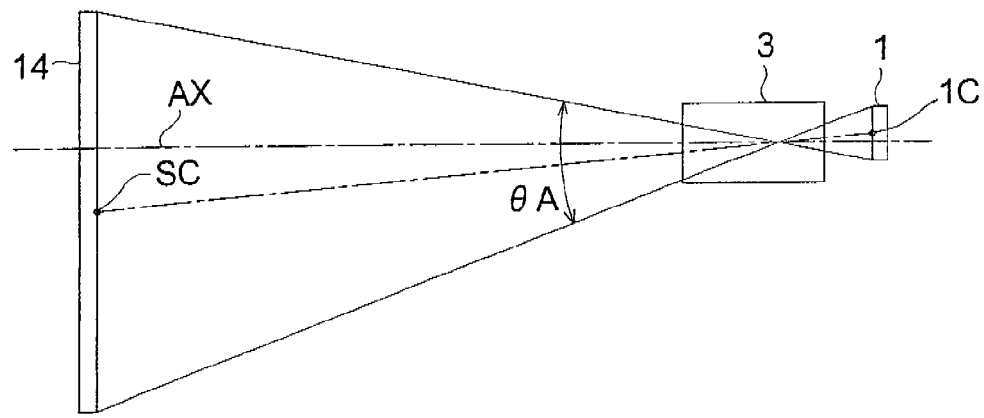
FIGS. 6A and 6B are optical configuration diagrams showing a change in a projection position as a result of attaching the converter lens, as viewed from the side.
Figure 6B:
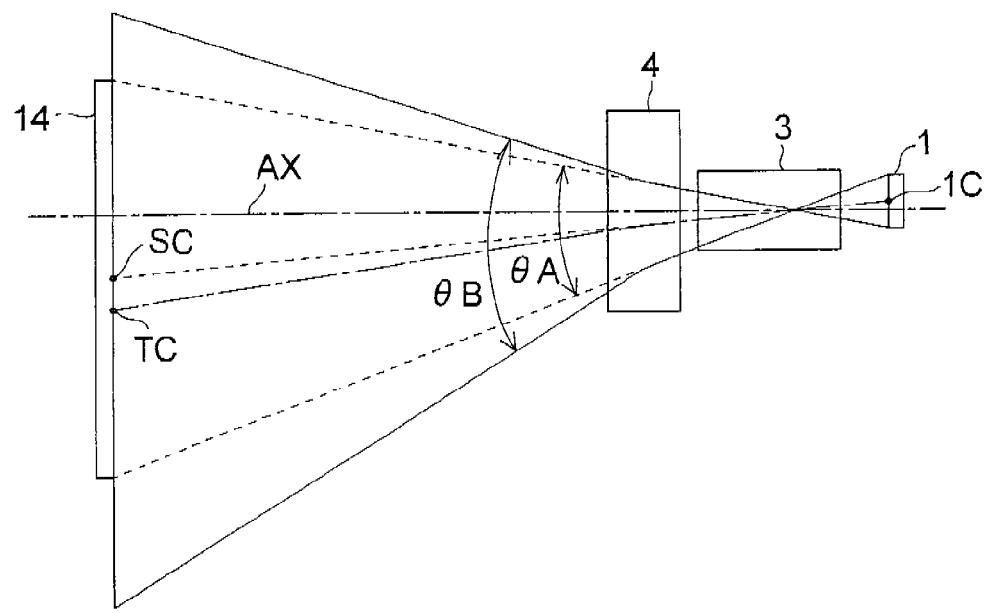

The third switching example of processing patterns relates to video position correction (that is, coordinate correction) by signal processing performed so that the position of a video displayed on the video display element 1 varies in accordance with whether or not the converter lens 4 is attached. In a theater, video projection is typically performed from above the screen center. Thus, as shown in FIG. 6A, a video display center 1C of the video display element 1 is shifted from an optical axis AX of the projection lens (in a vertically off-axis state). In this state, when a video in a scope size is displayed under the condition that a wide-type converter lens 4 whose vertical magnification changes is attached to the projection lens 3 and an upper and a lower portions of the video display element 1 are not displayed, as shown in FIG. 6B, a central position (projection image face center) TC of a projected image on the screen 14 changes (SC: screen center). That is, since the projection is performed from above the screen 14, the attachment of the converter lens 4 lowers the position of the projected image.

Figure 7A:
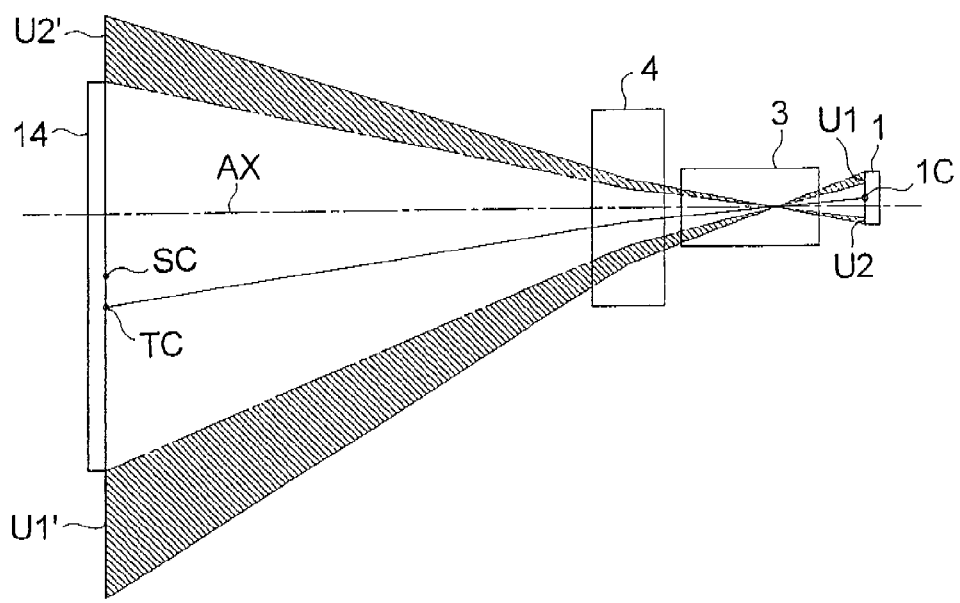
FIGS. 7A and 7B are diagrams illustrating video position correction in an attached state of the converter lens.
Figure 7B:
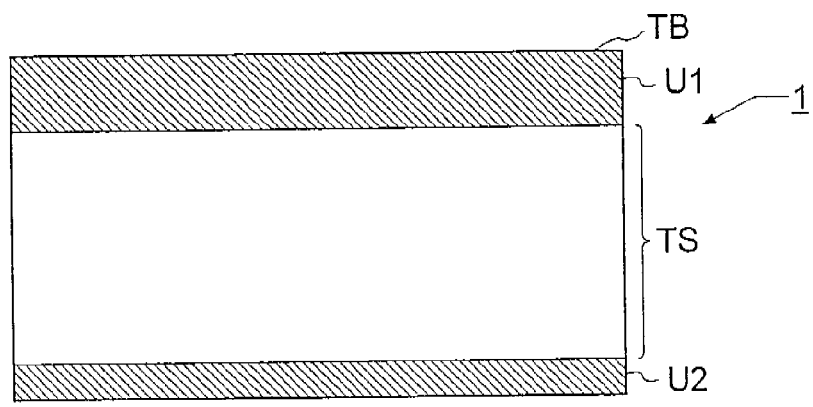

To avoid a change in the position of a projected image, signal processing may be performed so that the position of a video displayed on the video display element 1 varies in accordance with whether or not the converter lens 4 is attached. Specifically, it may be detected whether or not the converter lens 4 is present, and the position of the video displayed on the video display element 1 may be lowered if the converter lens 4 is in the attached state (inserted state). For example, as shown in FIG. 7A, the ratio between non-display regions U1 and U2 at the top and bottom of the video display element 1 may be changed and also the central position of the video displayed on the video display element 1 may be shifted (U1', U2': non-display regions at the position of the screen 14). FIG. 7B shows an arrangement example of the projection region TB, the screen region TS, and the non-display regions U1 and U2 on the video display element 1 in this condition.

When the video display element 1 displays a video on the screen region TS, as shown in FIG. 7A, a video center of the video display element 1 is located on the screen center SC. Canceling a change in the position of a projected image caused by the converter lens 4 through position correction of a video displayed on the video display element 1 in this manner permits projection on an optimum projection position while keeping favorable balance so that the position (that is, height) of the projected image does not change. Therefore, regardless of whether or not the converter lens 4 is attached, favorable video characteristics can be easily provided at low costs.

Even more specifically, as shown in FIG. 1A, when the position sensor 7 confirms the non-attached state (retracted state) of the converter lens 4, original video data in the hard disc 12 is subjected to signal processing in the normal processing pattern. A video signal obtained is transmitted to the video display elements 1R, 1G, and 1B corresponding to light of the different colors, and its display image is then projected on the screen 14 by the projection lens 3. At this point, the video center is located at the center of the video display surface of the video display element 1 (that is, a video is displayed with which a coordinate position of a projected image is normal). As shown in FIG. 1B, when the position sensor 8 confirms the attached state (inserted state) of the converter lens 4, the original video data in the hard disc 12 is subjected to signal processing in the video position correction processing pattern. A video signal obtained is transmitted to the video display elements 1R, 1G, and 1B respectively corresponding to light of the different colors, and its display image is then projected on the screen 14 by the projection lens 3 and the converter lens 4. At this point, the video center is shifted to a position off the center of the video display surface of the video display element 1 (that is, a video is displayed with which a coordinate position of a projected image is raised). The converter lens 4 used in the third switching example of processing patterns is not limited to a wide converter lens, but similarly applicable to a teleconverter lens.

Performing different signal processing on a video signal in accordance with whether or not the converter lens 4 is attached (that is, whether before or after the converter lens 4 is attached) as in the first to third switching examples of processing patterns described above can make projected image characteristics (tone, brightness, projection position, etc. of a projected image), which has changed as a result of attaching the converter lens 4, equal to or nearly equal to projected image characteristics when the converter lens 4 is not attached. Therefore, regardless of whether or not the converter lens 4 is attached, favorable video characteristics can be easily provided at low costs.

It may be detected automatically or by human judgment whether or not the converter lens 4 is attached. For the video projection device 13 described above, since the position sensors 7 and 8 detect whether or not the converter lens 4 is in the attached state or in the non-attached state, it is automatically detected whether or not the converter lens 4 is attached. Without using the position sensors 7 and 8, the human may judge whether or not the converter lens 4 is in the attached state or in the non-attached state, then a switch (instruction member) may be manually operated based on this judgment, and then the video processing part 11 may perform on a video signal different signal processing in accordance with whether or not the converter lens 4 is attached. Moreover, for the video projection device 13 described above, to attach or detach the converter lens 4 (that is, put the converter lens 4 into the attached state or the non-attached state), the driving switch 9 is manually operated to operate an attaching and detaching mechanism (the rail 5, the motor 6, the motor control part 10, etc.). Alternatively, the converter lens 4 may be manually attached and detached without using the attaching and detaching mechanism, or the converter lens 4 may be attached and detached automatically (by using the attaching and detaching mechanism) in accordance with an aspect ratio of video resources.

In the embodiment described above, when the converter lens 4 is attached, the video processing part 11 performs predetermined signal processing on video data stored in the hard disc 12 and outputs it to the video display element 1. Alternatively, the data subjected to the predetermined signal processing may be previously stored in the hard disc 12, and original video data and the video data subjected to the signal processing may be selected and outputted depending on whether or not the converter lens 4 is attached. In this case, the capacity of the hard disc 12 needs to be increased, but load of signal processing imposed on the video processing part 11 decreases. In either case, a video signal is switched so that a video signal to the video display element 1 varies depending on whether or not the converter lens 4 is attached; therefore favorable video characteristics can be provided regardless of whether or not the converter lens 4 is attached.

With the video projection device of the aforementioned embodiment, the video processing part, in accordance with whether or not the converter lens is attached, switches a video signal to the video display element. Thus, projected image characteristics (tone, brightness, projection position, etc. of a projected image), which has changed as a result of attaching the converter lens, can be made equal to or nearly equal to projected image characteristics when the converter lens is not attached. Moreover, with the video projection method of the aforementioned embodiment, when the converter lens is attached to the projection lens, a video signal to the video display element is switched. Thus, the projected image characteristics (tone, brightness, projection position, etc. of a projected image), which has changed as a result of attaching the converter lens, can be made equal to or nearly equal to the projected image characteristics when the converter lens is not attached. Therefore, according to the aforementioned embodiment, favorable video characteristics can be easily provided at low costs regardless of whether or not the converter lens is attached.

To faithfully express the tone of a movie work, the video projection device is required to perform strict color control. However, an increase in the number of lenses of the entire projection optical system as a result of attaching the converter lens decreases the ratio of rays on a short wavelength side where absorption is relatively large, thereby leading to tone change. As in the first switching example of the embodiment described above, performing signal processing so that the tone of a video displayed on the video display element varies in accordance with whether or not the converter lens is attached or performing signal processing so that the tone of the video displayed on the video display element varies depending on whether before or after the converter lens is attached permits making correction so that a change in the tone of a projected image does not occur.

In a theater, in view of viewability and safety during a movie, illumination of the ceiling and a foot area are set so that the brightness of a projected image is optimized. However, a change in the size of a projection image face on the screen as a result of attaching the converter lens changes the brightness on the screen surface. As in the second switching example of the embodiment described above, performing signal processing so that the brightness level of a video displayed on the video display element varies in accordance with whether or not the converter lens is attached or performing signal processing so that the brightness level of the video displayed on the video display element varies depending on whether before or after the converter lens is attached permits maintaining optimum condition so that a change in the brightness of a projected image does not occur.

Since video projection in a theater is performed from above the screen center in many cases, attaching to the projection lens a converter lens whose vertical magnification changes results in a change in the height of a projected image center. As in the third switching example of the embodiment described above, performing signal processing so that the position of a video displayed on the video display element varies in accordance with whether or not the converter lens is attached or performing signal processing so that the position of the video displayed on the video display element varies depending on whether before or after the converter lens is attached permits making correction so that a change in the height of the projected image does not occur.

Figure 8:
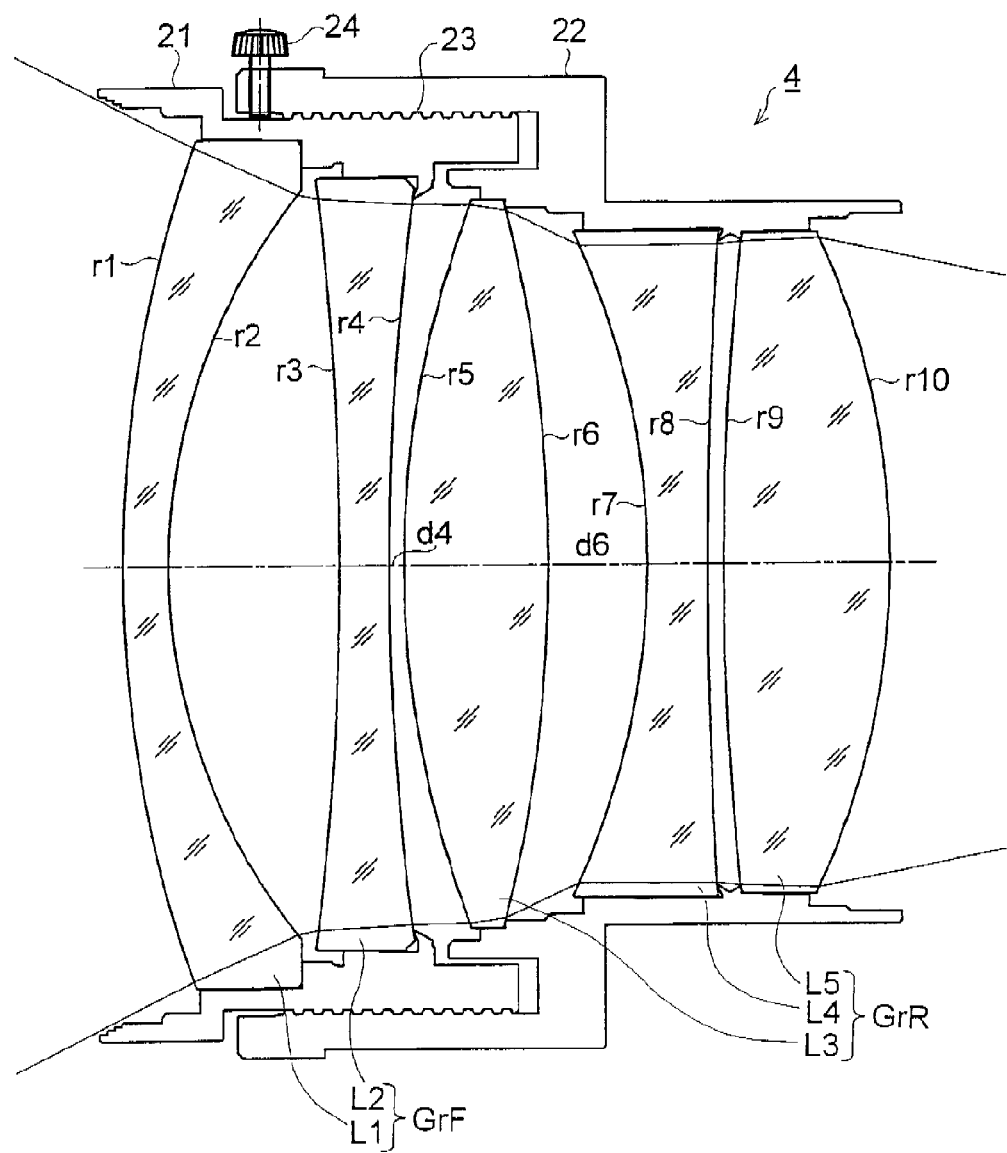
FIG. 8 is a sectional view showing one detailed example of the converter lens.

Next, configuration of the converter lens 4 will be described in more detail, referring to a detailed example thereof. FIG. 8 shows a sectional view of barrel structure and optical configuration (optical surface shape, optical path, etc.) of the converter lens 4. This converter lens 4 is a wide converter lens composed of: in order from the enlargement side, a first lens L1 having a negative optical power, a second lens L2 having a negative optical power, a third lens L3 having a positive optical power, a fourth lens L4 having a negative optical power, and a fifth lens L5 having a positive optical power. The first lens L1 and the second lens L2 are fixed to a first barrel 21, and the third lens L3, the fourth lens L4, and the fifth lens L5 are fixed to a second barrel 22. The first lens L1 and the second lens L2 fixed to the first barrel 21 form a front group GrF having negative-negative optical power arrangement. The third lens L3, the fourth lens L4, and the fifth lens L5 fixed to the second barrel 22 form a rear group GrR having positive-negative-positive optical power arrangement.

The first barrel 21 and the second barrel 22 are coupled together with a helicoids screw 23. A gap d4 in the converter lens 4 can be changed by rotating the first barrel 21 with respect to the second barrel 22. That is, the converter lens 4 is formed so that the gap d4 between the front group GrF and the rear group GrR can be changed by a gap adjustment mechanism formed of the helicoids screw 23. The gap d4 can be adjusted to a predetermined size and then the first barrel 21 and the second barrel 22 can be fixed with a lock screw 24 to thereby keep the gap d4 constant. The adjustment of the gap d4 is made by rotating the first barrel 21 through manual operation, but may be made automatically by using a driving mechanism composed of a motor, or the like.

For the detailed example of the converter lens 4 (FIG. 8), its optical construction data is listed below. In this construction data, ri (i=1, 2, 3 . . . ) denotes a radius of curvature (in mm) on the i-th surface counted from the enlargement side (screen 14 side), di (i=1, 2, 3 . . . ) denotes the i-th axial surface distance (in mm) counted from the enlargement side, and Ni (i=1, 2 . . . ) and vi (i=1, 2, . . . ) denote a refractive index for a d-line (Nd) and Abbe number (vd) of the i-th lens Li counted from the enlargement side. In addition, γ denotes angular magnification. The detailed example of the converter lens 4 represented by this construction data is a completely afocal optical system.

Detailed Example of the Converter Lens 4

| $\gamma = 0.78904$ | | | |
|---|---|---|---|
| [Radius of curvature] | [Axial surface distance] | [Refractive index] | [Abbe number] |
| r1 = 242.1202 | d1 = 8.88889 | N1 = 1.51872 | ν1 = 64.20 (L1) |
| r2 = 107.6192 | d2 = 34.1304 | | |
| r3 = −685.1896 | d3 = 9.5 | N2 = 1.74690 | ν2 = 49.22 (L2) |
| r4 = 685.1896 | d4 = 3.17144 | | |
| r5 = 170.5914 | d5 = 30.3188 | N3 = 1.58481 | ν3 = 40.89 (L3) |
| r6 = −256.0511 | d6 = 20.3416 | | |
| r7 = −130.5650 | d7 = 10 | N4 = 1.74794 | ν4 = 44.90 (L4) |
| r8 = 437.1546 | d8 = 3 | | |
| r9 = 402.5814 | d9 = 31.674 | N5 = 1.51872 | ν5 = 64.20 (L5) |
| r10 = −122.4312 | | | |

The detailed example of the converter lens 4 described above is a 0.79× wide converter lens, and as shown in FIG. 1, is used while attached in front of a three-plate projector for digital cinema. The front converter lens for a projector, compared to other converter systems, is advantageous in that the movement of the projection lens, etc., is not required and that the converter function works with little performance deterioration even when the position holding accuracy for the projection lens is rough. In addition, since the converter attachment position is located in front of the projection lens, that is, out of the projection system, the converter lens can be formed with a simple attaching and detaching mechanism that is later attached to a typical projection system and that moves toward and retracts from the front of the projection lens. Therefore, the configuration such that the converter lens is detachably provided in front of the projection lens makes it easy to convert the projection magnification while holding high performance with simple configuration.

In the video projection device 13 described above, when the video display surface of the video display element 1 is composed of square pixels (2048×1080), display is performed in a size of 1998×1080 pixels for video resources in a vista size of 1.85:1 (FIG. 4A), while display is performed in a size of 2048×858 pixels for video resources in a scope size of 2.38:1 (FIG. 4B). That is, in accordance with the aspect ratio of video resources, the converter lens 4 is attached or detached and also a video region displayed on the video display element 1 changes. If the video resources are in the scope size, as a result of attaching the converter lens 4, a projection image is provided which has a wide lateral width at the same height as that of those in the vista size. For example, when video resources with different vertical and horizontal ratios are played during a movie or the like, switching the format from 1.85:1 to 2.38:1 widens the angle of view as a result of attaching the converter lens 4, thus making it possible to provide not a small projected image in a vertical cut but a powerful projected image in an even larger projection size.

Typically, a projection distance to a screen varies depending on a location (for example, theater) where projection takes place, and the converter lens is typically an afocal optical system. Thus, attaching the converter lens to the projection lens whose focus has been adjusted shifts the focus position out of the screen. For example, attaching the converter lens to the projection lens when the converter lens is in the non-attached state with the focus adjusted to a screen with a projection distance of 50*m* results in adjusting the focus at position $|OD| \times \gamma^2 = 50$ m×$0.79^2 = 31$ m (where OD is a projection distance and γ is angular magnification). Thus, the focus needs to be adjusted again to the screen located 50 m away with a focus mechanism (for example, front focus mechanism, internal focus mechanism, entire-movement focus mechanism, or the like) of the projection lens. However, adjusting the focus with the focus mechanism of the projection lens every time the converter lens is attached or detached results in complicated switching operation. A projection lens of a projector for digital cinema in particular is very large in size, requiring much labor for focus adjustment, which makes it inconvenient to perform such operation when video resources are frequently switched.

In the video projection device 13, the gap d4 between the front group GrF and the rear group GrR can be changed by the gap adjustment mechanism formed of the helicoids screw 23. That is, the gap d4 can be adjusted to a predetermined size by the gap adjustment mechanism composed of the helicoids screw 23, which permits the adjusted gap d4 to be kept constant by the lock screw 24. Thus, in order to avoid the focus position shift even when the converter lens 4 is attached to the projection lens 3, the gap d4 can be adjusted to a setting in accordance with a projection distance OD to the screen 14 before the converter lens 4 is attached. Since determining the projection distance OD to the screen 14 determines the gap d4, previously setting the gap d4 in accordance with the projection distance OD (that is, turning the state from a completely afocal state to a predetermined power state) does not cause focus position shift even when the converter lens 4 is attached. Moreover, setting the gap d4 in this manner also eliminates the needs for moving optical elements of the projection lens 3. Therefore, without complicated operation and complicated structure, the focus position shift accompanying the attachment and detachment of the converter lens 4 can be avoided. For example, in a projection system to which the video projection device 13 and the screen 14 are fixed, frequent attachment and detachment operation of the converter lens 4 does not cause inconvenience of focus readjustment.

Even when the first barrel 21 is rotated by the gap adjustment mechanism formed of the helicoids screw 23 in order to adjust the gap d4 between the front group GrF and the rear group GrR to a predetermined size as described above, optical performance does not deteriorate since the converter lens 4 is an axisymmetric optical system. For example, for a non-axisymmetric optical system such as an anamorphic converter lens, changing the gap in the converter lens requires a gap adjustment mechanism for linear driving, thus complicating the structure. With the gap adjustment mechanism of the converter lens 4 described above, the focus position shift accompanying the attachment and detachment of the converter lens 4 can be prevented without complicating the structure.

Figure 9A:
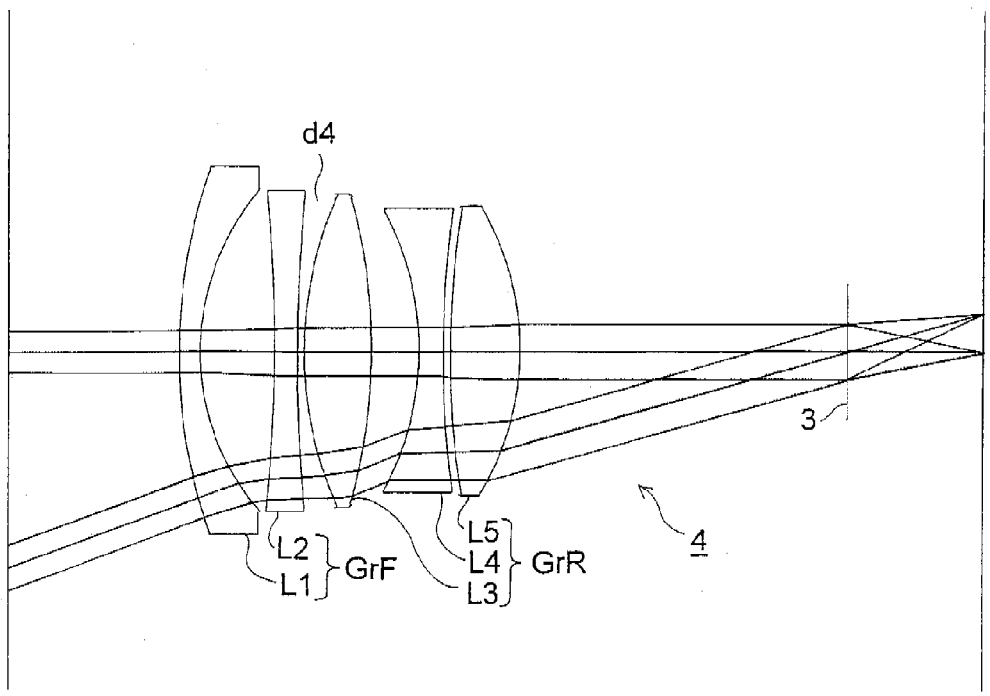
FIGS. 9A and 9B are optical path diagrams showing optical configuration for projection distances of −50000 mm and −8000 mm when the converter lens of FIG. 8 is attached to a projection lens having a focal length of 60 mm.
Figure 9B:
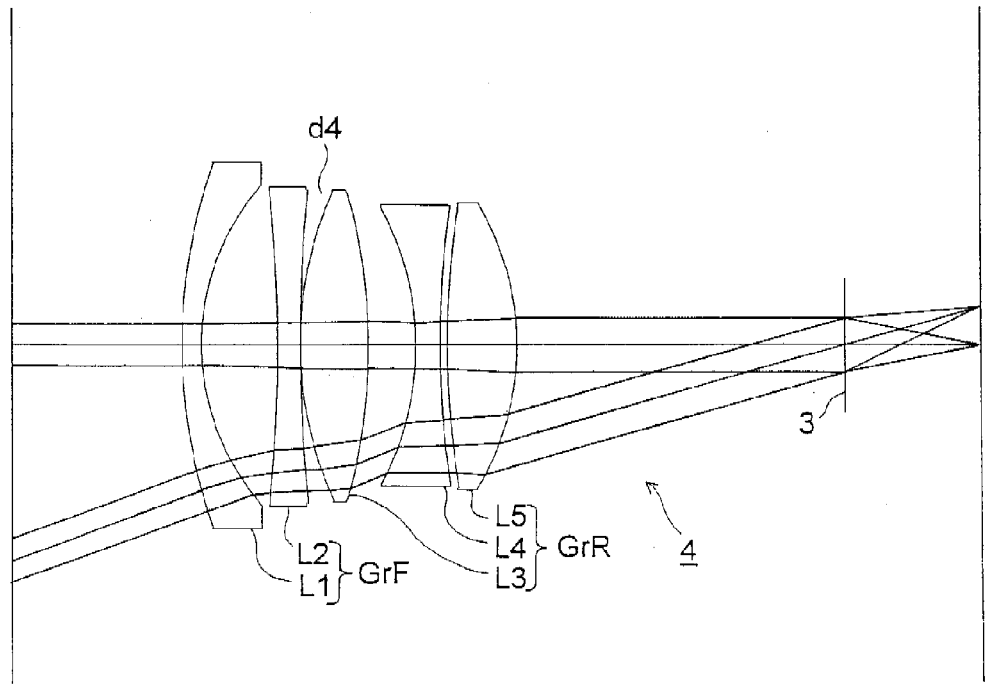

FIGS. 9A and 9B show optical configuration when the converter lens 4 (FIG. 8) is attached to a projection lens 3 as an ideal lens having a focal length FL of 60 mm. A gap CP between the converter lens 4 and the projection lens 3 is 140 mm and a maximum image height Y' is 17 mm. FIG. 9A shows a state in which the gap d4 is set at 2.68517 in accordance with the projection distance OD set at −50000 mm. FIG. 9B shows a state in which the gap d4 is set at 0.181527 in accordance with the projection distance OD set at −8000 mm (where OD is a projection distance, that is, a distance from a surface closet to the enlargement side to the screen surface). The wide-type converter lens 4 can be formed with the front group GrF having negative-negative optical power arrangement and the rear group GrR having positive-negative-positive optical power arrangement in order from the screen 14 side, and then the gap d4 between the front group GrF and the rear group GrR can be changed to thereby prevent focus position shift accompanying the attachment and detachment of the converter lens 4 with a small amount of movement.

Figure 10A:
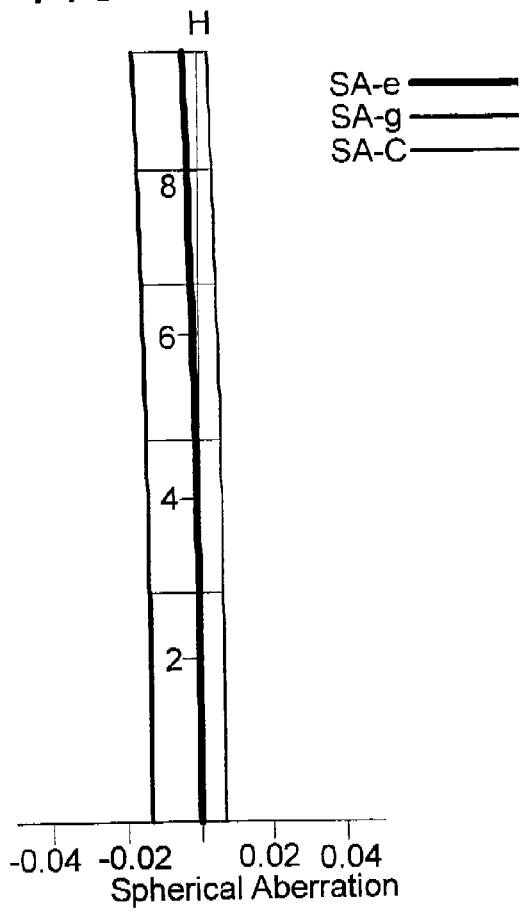
FIGS. 10A to 10D are aberration diagrams in the state shown in FIG. 9A.
Figure 10B:
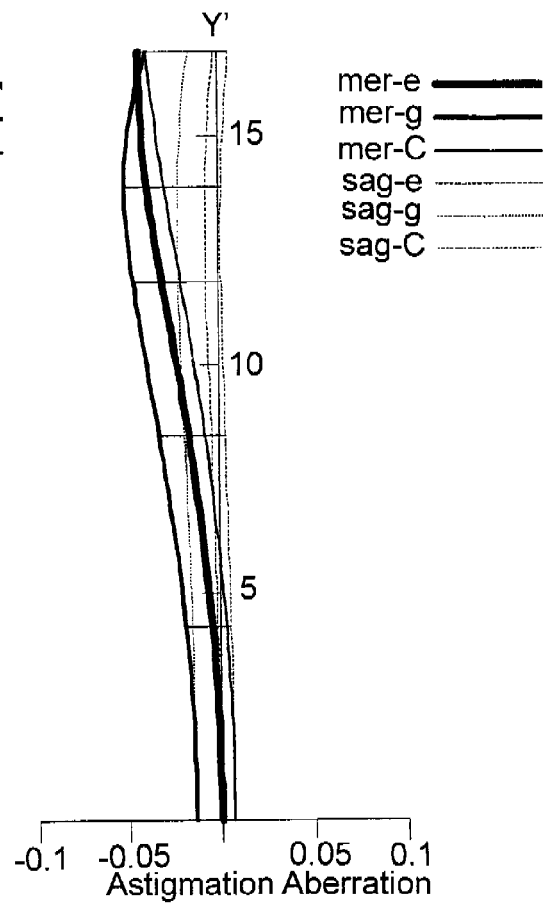
Figure 10C:
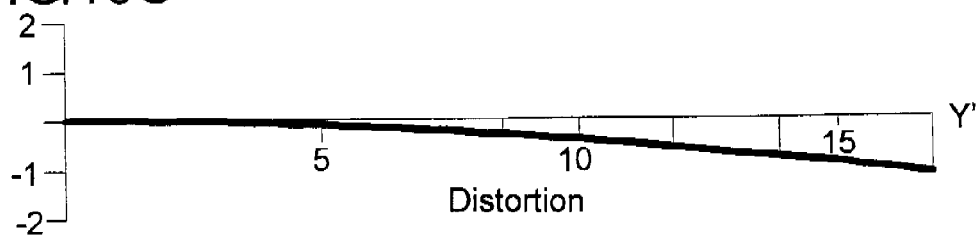
Figure 10D:
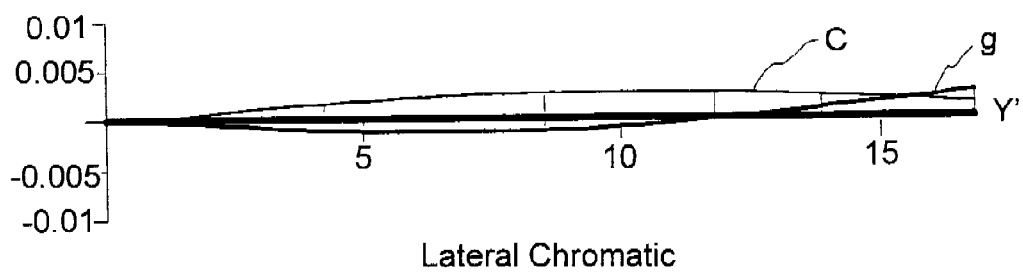
Figure 11A:
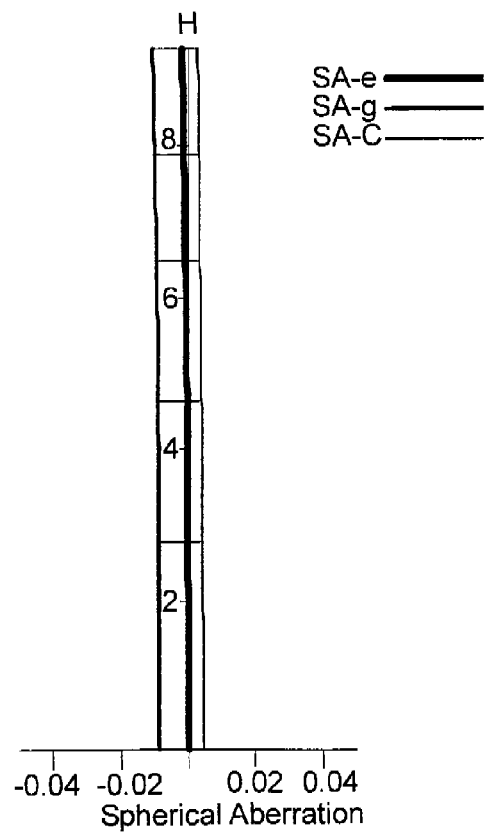
FIGS. 11A to 11D are aberration diagrams in the state shown in FIG. 9B.
Figure 11B:
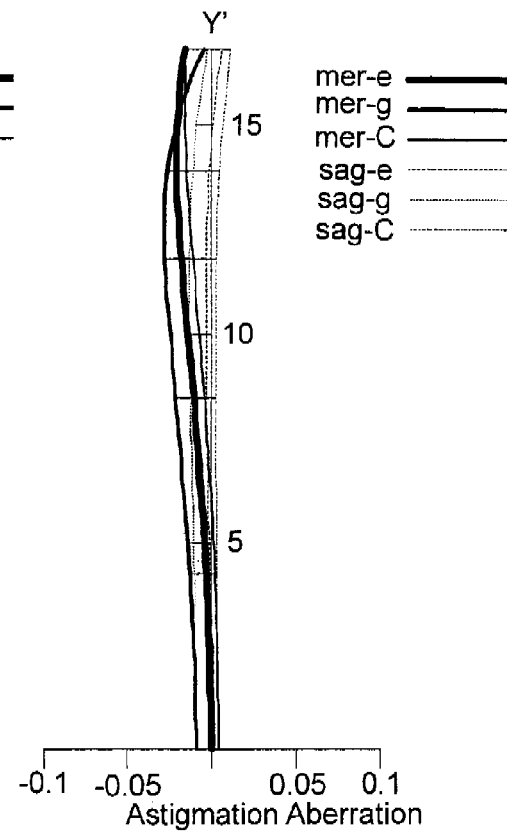
Figure 11C:
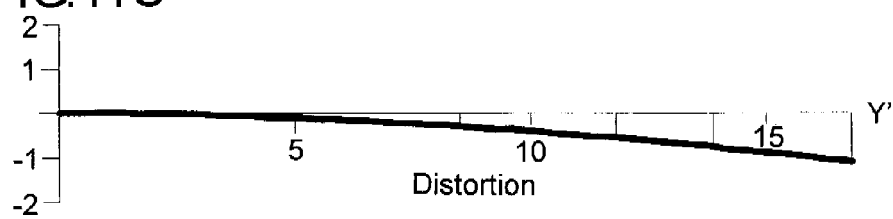
Figure 11D:
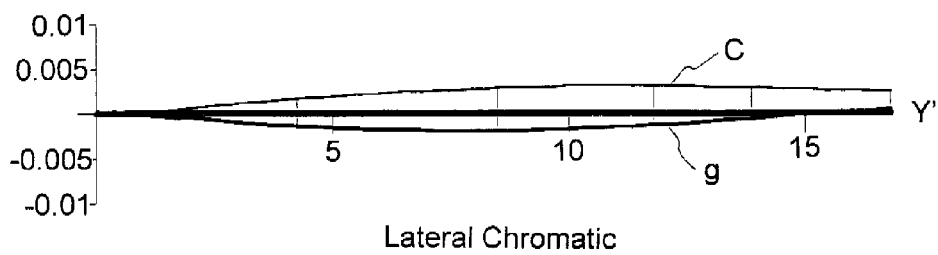

FIGS. 10A to 10D are aberration diagram in the state shown in FIG. 9A. FIGS. 11A to 11D are aberration diagrams in the state shown in FIG. 9B. FIGS. 10A and 1A show spherical aberration (in mm) where H denotes a height of incidence (in mm). FIGS. 10B and 11B show astigmation aberration (in mm) where Y' denotes a maximum image height (in mm). FIGS. 10C and 11C show distortion (in %) where Y' denotes a maximum image height (in mm). FIGS. 10D and 11D show lateral chromatic aberration (in mm) where Y' denotes a maximum image height (in mm). Lines SA-e, SA-g, and SA-C denote spherical aberration for an e-line, g-line, and C-line. Lines mer-e, mer-g, and mer-C denote meridional image surfaces for the e-line, g-line, and C-line, respectively. Lines sag-e, sag-g, and sag-C denote sagittal image surfaces for the e-line, g-line, and C-line, respectively. Moreover, FIGS. 10D and 11D show chromatic aberration of magnification for the g-line and C-line. As can be seen from FIGS. 10A to 10D and 11A to 11D, favorable aberration performance can be provided for either of projection distances of OD −50000 mm and −8000 mm.

Typically, a difference in a location (for example, theater) where a projector is installed results in a difference in the relationship between a distance to the screen and a screen size. This requires preparation of projection lenses having various focal lengths and then selection of a lens to be loaded as appropriate. The video projection device 13 described above is loaded replaceably with one of a plurality of types of projection lenses 3 and projects a video on the screen 14 at a fixed position. However, replaceably loading one of the plurality of types of projection lenses 3 causes deterioration in aberration performance depending on matching between the converter lens 4 and the projection lens 3.

In the video projection device 13, a gap d6 in the converter lens 4 can be changed to thereby prevent deterioration in the aberration performance. Changing the gap d6 by using a gap adjustment mechanism similar to the aforementioned gap adjustment mechanism formed of the helicoids screw 23 permits adjustment of this gap d6 to a predetermined size, thus keeping the adjusted gap d6 constant with the lock screw 24. Thus, in order to prevent aberration deterioration accompanying the replacement of the projection lens 3 even when the converter lens 4 is attached to the projection lens 3, the gap d6 can be adjusted to a setting in accordance with the type of the projection lens 3 before the converter lens 4 is attached. The determination of the type of the projection lens 3 to be loaded determines the gap d6. Thus, previously setting the gap d6 in accordance with the type of the projection lens 3 (that is, turning the state from a completely afocal state to a predetermined power state) does not cause aberration deterioration accompanying the replacement of the projection lens even when the converter lens 4 is attached. Moreover, setting the gap d6 in this manner does not require movement of the optical elements of the projection lens 3. Therefore, it is possible to prevent aberration deterioration accompanying the replacement of the projection lens without complicated operation and complicated structure. For example, in a projection system to which the video projection device 13 and the screen 14 are fixed, even when attachment and detachment operation of the converter lens 4 and the replacement of the projection lens 3 are performed frequently, favorable optical performance can be maintained.

For example, even when the gap d6 is adjusted to a predetermined size by rotating the first barrel 21 with the gap adjustment mechanism formed of the helicoids screw 23, optical performance does not deteriorate since the converter lens 4 is an axisymmetric optical system. For example, for a non-axisymmetric optical system such as an anamorphic converter lens, changing the gap in the converter lens requires a gap adjustment mechanism for linear driving, thus complicating the structure. With the gap adjustment mechanism of the converter lens 4 described above, the aberration deterioration accompanying the replacement of the projection lens can be prevented without complicating the structure.

Figure 12A:
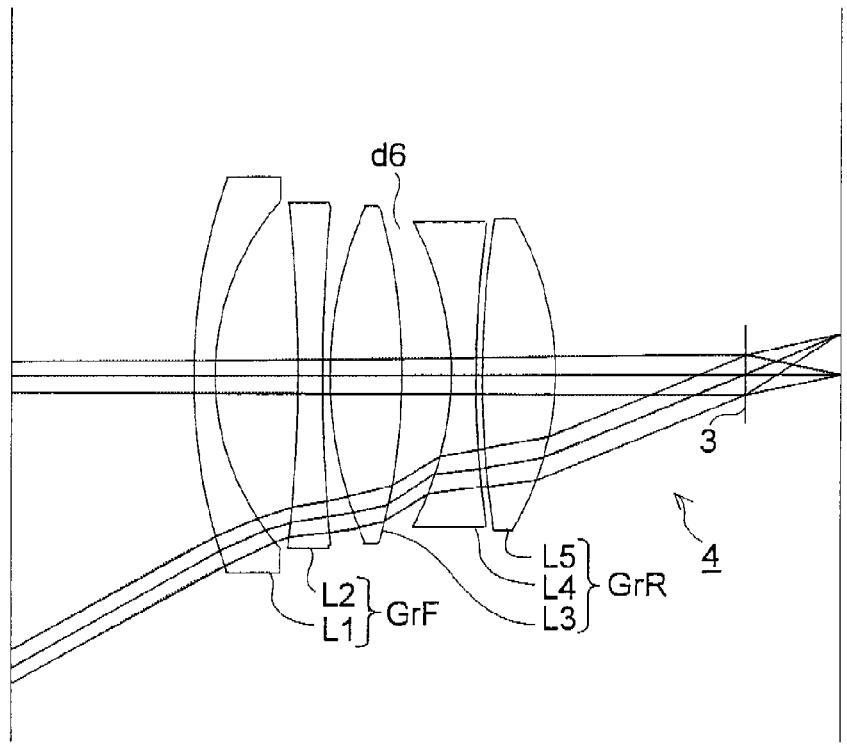
FIGS. 12A and 12B are optical path diagrams showing optical configuration (for a projection distance of −50000 mm) before and after aberration correction when the converter lens of FIG. 8 is attached to a projection lens having a focal length of 40 mm.
Figure 12B:
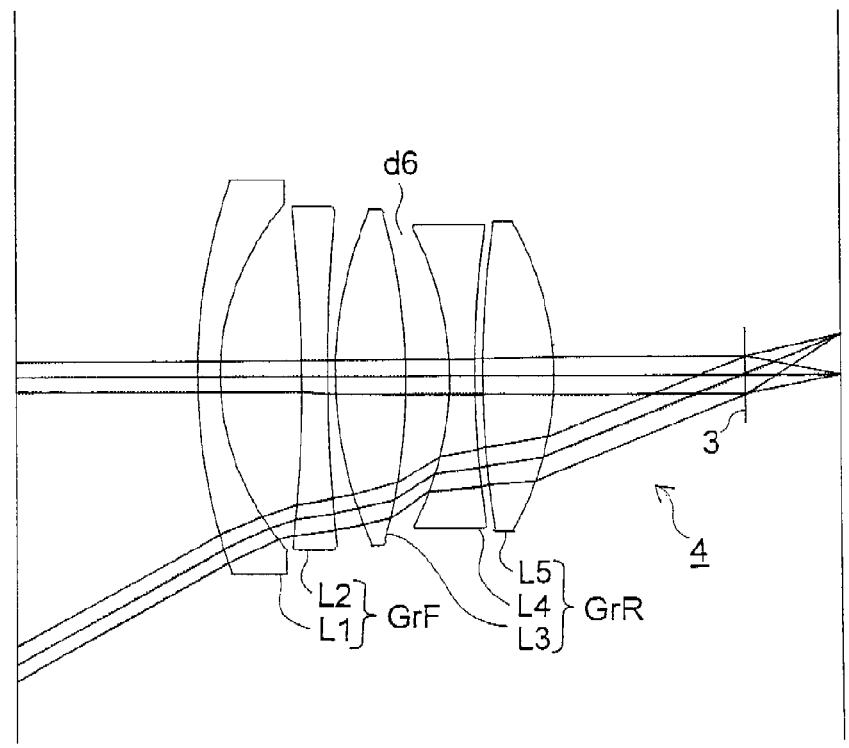

FIGS. 12A and 12B show optical configuration when the converter lens 4 (FIG. 8) is attached to a projection lens 3 as an ideal lens having a focal length FL of 40 mm. A projection distance OD is −50000 mm, d4 is 3.17144 mm, a gap CP between the converter lens 4 and the projection lens 3 is 70 mm, and a maximum image height Y' is 17 mm. FIG. 12A shows a state in which the gap d6 before aberration correction is set at 20.3416. FIG. 12B shows a state in which the gap d6 after the aberration correction is set at 18.2.

FIGS. 13A to 13D are aberration diagrams in the state shown in FIG. 12A. FIGS. 14A to 14D are aberration diagrams in the state shown in FIG. 12B. FIGS. 13A and 14A show spherical aberration (in mm) where H denotes a height of incidence (in mm). FIGS. 13B and 14B show astigmation aberration (in mm) where Y' denotes a maximum image height (in mm). FIGS. 13C and 14C show distortion (in %) where Y' denotes a maximum image height (in mm). FIGS. 13D and 14D show lateral chromatic aberration (in mm) where Y' denotes a maximum image height (in mm). Lines SA-e, SA-g, and SA-C denote spherical aberration for an e-line, g-line, and C-line, respectively. Lines mer-e, mer-g, and mer-C denote meridional image surfaces for the e-line, g-line, and C-line, respectively. Lines sag-e, sag-g, and sag-C denote sagittal image surfaces for the e-line, g-line, and C-line, respectively. FIGS. 13D and 14D show chromatic aberration of magnification for the g-line and C-line.

Even the converter lens 4 capable of providing favorable optical performance when attached to a projection lens 3 having an FL of 60 mm (a gap CP of 140 mm) has very large field curvature as can be seen from FIG. 13B when attached to a projection lens 3 having an FL of 40 mm (a gap CP of 70 mm). As shown in FIG. 12B, adjusting the gap d6 to be set at 18.2 permits providing an image whose aberration, i.e., field curvature, has been satisfactorily corrected as shown in FIG. 14B.

As described above, changing a predetermined gap in the converter lens 4 to a setting in accordance with at least one of the projection distance to the screen 14 and the type of the projection lens 3 by using the gap adjustment mechanism permits this gap adjustment to be performed before the converter lens 4 is attached, and also eliminates the needs for moving the optical elements of the projection lens 3. Therefore, without complicated operation and complicated structure, the focus position shift accompanying the attachment and detachment of the converter lens 4 or aberration deterioration accompanying the replacement of the projection lens 3 can be avoided. The configuration such that a predetermined gap in the converter lens 4 is changed by the gap adjustment mechanism described above is not limited to a wide converter lens, but similarly applicable to a teleconverter lens.

Performing, after the gap adjustment described above, different signal processing on a video signal in accordance with whether or not the converter lens 4 is attached (that is, whether before or after the converter lens 4 is attached) as in the first to third switching examples of processing patterns described above makes projected image characteristics (tone, brightness, projection position, etc. of a projected image), which have changed as a result of attaching the converter lens 4, equal to or nearly equal to projected image characteristics when the converter lens 4 is not attached. Therefore, without causing focus position shift accompanying the attachment and detachment of the converter lens 4 or the aberration deterioration accompanying the replacement of the projection lens 3 and even regardless of whether or not the converter lens 4 is attached, favorable video characteristics can be easily provided at low costs.

What is claimed is:

1. A video projection device comprising:
   a video display element displaying a video by an electrical video signal;
   a projection lens projecting on a screen the video displayed on the video display element;
   a converter lens attachably and detachably provided for the projection lens;
   a judging element which judges whether or not the converter lens has been attached to the projection lens and which generates a judging signal indicating whether or not the converter lens has been attached to the projection lens; and
   a video processing part receiving the judging signal and outputting different video signals to the video display element in accordance with whether or not the converter lens is attached.

2. The video projection device according to claim 1, further comprising a sensor detecting that the converter lens is located at a predetermined position with respect to the projection lens and outputting a detection signal,
   wherein the video processing part switches a video signal to the video display element based on the detection signal from the sensor.

3. The video projection device according to claim 1, further comprising an instruction member giving instructions for locating the converter lens at a predetermined position with respect to the projection lens,
   wherein the video processing part switches a video signal to the video display element based on the instructions from the instruction member.

4. The video projection device according to claim 1,
   wherein the video processing part switches a video signal to the video display element such that a position of the video displayed on the video display element varies in accordance with whether or not the converter lens is attached.

5. The video projection device according to claim 4,
   wherein the video processing part changes the position of the video displayed on the video display element such that a central position of a video projected on the screen does not change depending on whether or not the converter lens is attached.

6. The video projection device according to claim 1,
   wherein the video processing part switches a video signal to the video display element such that tone of the video displayed on the video display element varies in accordance with whether or not the converter lens is attached.

7. The video projection device according to claim 6,
   wherein the video display element comprises a green video display element for displaying a green video, a red video display element for displaying a red video, and a blue video display element for displaying a blue video,
   wherein the video processing part, when the converter lens is attached, changes intensity of a signal to each of the video display elements such that a brightness level displayed on the blue video display element is enhanced relatively with respect to brightness levels displayed on the other two video display elements.

8. The video projection device according to claim 1,
   wherein the video processing part changes a video signal to the video display element such that a brightness level of the video displayed on the video display element varies in accordance with whether or not the converter lens is attached.

9. The video projection device according to claim 8,
   wherein the video processing part changes a video signal to the video display element such that brightness of a video projected on the screen does not change depending on whether or not the converter lens is attached.

10. A video projection method comprising:
    a display step of displaying a video on a video display element by an electrical video signal;
    a projection step of projecting, on a screen by a projection lens, the video displayed on the video display element;
    an attaching step of attaching a converter lens in front of the projection lens;
    a judging step of judging whether or not the converter lens has been attached to the projection lens; and
    a signal output step of switching a video signal to the video display element in accordance with whether or not the converter lens has been attached to the projection lens.

11. The video projection method according to claim 10,
    wherein tone of the video displayed on the video display element varies depending on whether or not the converter lens is attached.

12. The video projection method according to claim 11,
    wherein as the video display element, a plurality of video display elements are provided,
    wherein a step of displaying images respectively corresponding to different colors of the video display elements and synthesizing the images is further provided, and
    wherein a ratio between intensities of signals to the video display elements is varied in the signal outputting step.

13. The video projection method according to claim 10,
    wherein a brightness level of the video displayed on the video display element varies depending on whether or not the converter lens is attached.

14. The video projection method according to claim 13,
    wherein brightness of a video projected on the screen does not change depending on whether or not the converter lens is attached.

15. The video projection method according to claim 10,
    wherein a position of the video displayed on the video display element varies depending on whether or not the converter lens is attached.

16. The video projection method according to claim 15,
    wherein a central position of a video projected on the screen does not change depending on whether or not the converter lens is attached.

* * * * *